(12) United States Patent
Günther

(10) Patent No.: US 8,905,608 B2
(45) Date of Patent: Dec. 9, 2014

(54) OPTICAL BODY FOR A VEHICLE LIGHT

(71) Applicant: Truck-Lite Europe GmbH, Eisenach (DE)

(72) Inventor: Thilo Günther, Wutha-Farnroda (DE)

(73) Assignee: Truck-Lite Europe GmbH, Eisenach (DE)

( * ) Notice: Subject to any disclaimer, the term of this patent is extended or adjusted under 35 U.S.C. 154(b) by 85 days.

(21) Appl. No.: 13/800,405

(22) Filed: Mar. 13, 2013

(65) Prior Publication Data
US 2014/0056019 A1    Feb. 27, 2014

(30) Foreign Application Priority Data

Aug. 21, 2012  (DE) .......................... 10 2012 107 676

(51) Int. Cl.
| | |
|---|---|
| F21V 5/00 | (2006.01) |
| F21S 8/10 | (2006.01) |
| F21V 5/04 | (2006.01) |
| F21V 7/00 | (2006.01) |
| G02B 19/00 | (2006.01) |
| G02B 3/00 | (2006.01) |

(52) U.S. Cl.
CPC ................. *F21S 48/00* (2013.01); *F21V 5/045* (2013.01); *F21S 48/2212* (2013.01); *F21V 5/04* (2013.01); *F21V 7/00* (2013.01); *G02B 19/0066* (2013.01); *G02B 3/005* (2013.01)
USPC ............ 362/522; 362/244; 362/511; 362/520

(58) Field of Classification Search
CPC ............. G02B 19/0066; F21S 48/1233; F21S 48/1241; F21S 48/1275; F21S 48/2212; F21V 5/045
USPC .................. 362/244, 509, 511, 516, 520–522
See application file for complete search history.

(56) References Cited

U.S. PATENT DOCUMENTS

| | | | |
|---|---|---|---|
| 6,783,268 B2 * | 8/2004 | Aynie et al. ................... | 362/244 |
| 8,123,388 B2 * | 2/2012 | Ookubo ....................... | 362/512 |
| 2005/0265041 A1 | 12/2005 | Wimbert | |

* cited by examiner

*Primary Examiner* — Stephen F Husar
(74) *Attorney, Agent, or Firm* — Roberts Mlotkowski Safran & Cole, P.C.; David S. Safran

(57) ABSTRACT

An optical body for a vehicle light serves for coupling in, passing on and emitting the light delivered by a light source in a conical spatial region. It has a light emission surface and a recess which is opposite thereto and which has a longitudinal axis. The recess has an annularly closed inner peripheral wall which surrounds the longitudinal axis and a cover wall which extends transversely relative to its longitudinal axis and in which there is an optical structure. To improve the emission, a plurality of optically active surface portions are provided arranged around the point at which the longitudinal axis of the recess passes through the cover wall and each of which has a focal point lying on the longitudinal axis and the focal points of at least two of the surface portions are at a mutual spacing in the direction of the longitudinal axis.

19 Claims, 2 Drawing Sheets

OPTICAL BODY FOR A VEHICLE LIGHT

BACKGROUND OF THE INVENTION

1. Field of the Invention

The invention concerns an optical body which serves for coupling in, passing on and emitting the light delivered by a light source in a conical spatial region, wherein the optical body has a light emission surface and a recess which is opposite thereto and which has a longitudinal axis and in which the light source can be so positioned that the central axis of the conical spatial region coincides with the longitudinal axis of the recess and wherein the recess has an annularly closed inner peripheral wall which surrounds the longitudinal axis and a cover wall which extends transversely relative to its longitudinal axis and in which there is provided an optical structure for altering the spread angle of the light beam passing therethrough, and to a vehicle light which is equipped with at least one such optical body.

2. Description of Related Art

Optical bodies of the above-indicated type are known, for example, from German Patent Application DE 10 2004 026 530 B3 and corresponding U.S. Patent Application Publication 2005/0265041 A1. These bodies are flat plate-shaped bodies which comprise a light-conducting material and which have two main surfaces extending approximately parallel to a main central plane defined by XZ-coordinates, from which they are at equally spaced in the Y-direction perpendicular to the XZ-coordinates, and the vertical projections of which (in the Y-direction) on to the XZ-plane are coincident.

Each of these known optical bodies has a respective base portion having a cylindrical recess in which a lighting means, for example, an LED, can be introduced to such an extent that the light delivered thereby into a conical solid angle region passes practically completely into the optical body, wherein the light cone delivered by the LED and the recess have a common central axis extending parallel to the Z-direction. Light entry is affected, in part, by way of the inner cylindrical peripheral wall, and in part, by way of the cover surface of the recess, that is in opposite relationship to the LED, wherein a convergent optical means is provided in that cover surface. The optical body is of a mirror-symmetrical configuration with respect to the plane extending through the central axis and perpendicular to the XZ-plane and is of an approximately V-shape configuration so that it has two arms which extend in the light propagation direction and away from the central axis and whose side surfaces, that connect the main surfaces together, serve to distribute in particular the light which has entered through the side wall of the recess in the X-direction by total reflection and to pass it on in the Z-direction. On their light emission surface connecting the main surfaces, the legs of the V-shape of the optical body have additional optical elements in order to distribute the light issuing here into the medium air, over a region which is as wide as possible. A plurality of such optical bodies can be so connected together that their main central planes are aligned with each other and two adjacent optical bodies touch each other in the region of the tips of their V-legs. For such an arrangement that includes a plurality of optical bodies, there is provided a frontally disposed optical means which is common to all of the optical bodies and which is separated from the light emission surfaces of the optical bodies by an air gap and by means of which the actual desired lighting function of the respective vehicle light in which the optical body arrangement is to be fitted is achieved.

The known optical bodies suffer from the following series of disadvantages:

There are comparatively long light paths in the light-conducting medium and the light has to pass through a total of four interfaces (two of each optical body and two of the frontally disposed optical means). That therefore gives rise to light losses.

Difficulties in terms of production engineering occur in particular when the attempt is made to form the frontally disposed optical means in one piece with the optical body or bodies. If the frontally disposed optical means is produced in the form of an independent component, the assembly expenditure is increased.

Both the individual optical bodies and also the frontally disposed optical means have to be adapted to the respectively desired lighting function, in respect of the geometrical configuration.

As the apex point of the light cone emitted by an LED is at a different spacing in the direction of the central axis, depending on the respective LED type, from the mounting base of the LED, generally a printed circuit board, that is to be fixedly connected to the rear side of the optical bodies, the optically active surfaces of the optical elements which are intended to render parallel the light passing into the optical body and to pass it on to the light emission side, have to be adapted to the respective type of LED.

In particular, the requirement that the optical bodies have to be adapted both to the lighting function to be achieved and also to the LEDs used leads to a considerable increase in the cost of their manufacture.

SUMMARY OF THE INVENTION

In view of the foregoing, a primary object of the invention is to provide an optical element in which specific adaptation is not required either to the desired lighting function or to the respective type of LED used.

To attain that object, the invention is provided with the features described hereing.

While in the prior art the optical structure provided in the cover wall of the recess serving to receive the LED is a unitary converging lens which is rotationally symmetrical relative to the longitudinal axis, according to the invention it is provided that this structure is broken up into a plurality of, preferably four, optically active surface portions of which each has its own focal point which is on the longitudinal axis, wherein the focal points of at least two of the surface portions, and preferably all the surface portions, are spaced from each other in the direction of the longitudinal axis.

A corresponding consideration also applies to the division of the inwardly disposed side wall of the recess into four individual, optically active surface portions and of the two side surfaces of the optical body which pass the light which is radiated into the optical body and which is incident thereon from the interior to the light emission surface by total reflection.

Preferably, therefore, the arrangement affords twelve optically active surface portions, each of which has its own focal point. Those focal points are arranged in a row in the manner of a string of beads on the longitudinal axis of the recess, at mutual spacings.

Because there is a departure from rotational symmetry with respect to the central longitudinal axis, both for the optical structure at the cover surface of the recess and also the optically active surface portions of the inside wall of the recess and also the optically active surface portions of the side surfaces of the optical body, the configuration of the molding serving to produce the optical body according to the invention is admittedly somewhat more complicated and expensive, but nonetheless that affords the advantage that the apex point of the light cone emitted by the respective LED can be displaced within comparatively wide limits in the direction of the central longitudinal axis. In that way, it is possible to use widely varying LEDs in connection with an optical body according to the invention.

A further advantage is that the optical arrangement according to the invention distributes the light over a large vertical and horizontal angular region in such a way that widely different lighting or signal functions can be implemented with one and the same optical body arrangement, without a further frontally disposed optical means being required.

By way of example, the following signal functions can be implemented with one and the same optical body arrangement:
- stop light additional brake light,
- stop light,
- rear light,
- rear fog light,
- reversing light,
- flashing indicator light,
- headlight,
- daylight running light,
- fog light,
- side marker light,
- position light, and
- interior lamps.

The optical bodies according to the invention also have a homogenous appearance both in the switched-on and also in the switched-off condition. Large areas can be homogenously illuminated with a minimum number of light sources.

The above-mentioned signal functions can be implemented with widely different installation angles in respect of the correspondingly equipped vehicle lights on the respective vehicle.

A plurality of optical bodies according to the invention can be arranged in mutually juxtaposed or superposed relationship. The optical bodies can be arranged in a row linearly or following a curve or can be used individually in relation to smaller vehicle lights.

The invention is described hereinafter by means of an embodiment by way of example with reference to the accompanying drawings.

DETAILED DESCRIPTION OF THE INVENTION

In all figures, mutually corresponding or identical parts are denoted by the same references. For the sake of simplicity, the side from which the respective lighting means can be inserted into the recess provided in the optical body according to the invention is referred as the "bottom side" so that the light emission surface 6 opposite to that side forms the "top side". The terms "bottom" and "top" are however not to be interpreted as a limitation on the possible installation positions of an optical body according to the invention.

Figure 1:
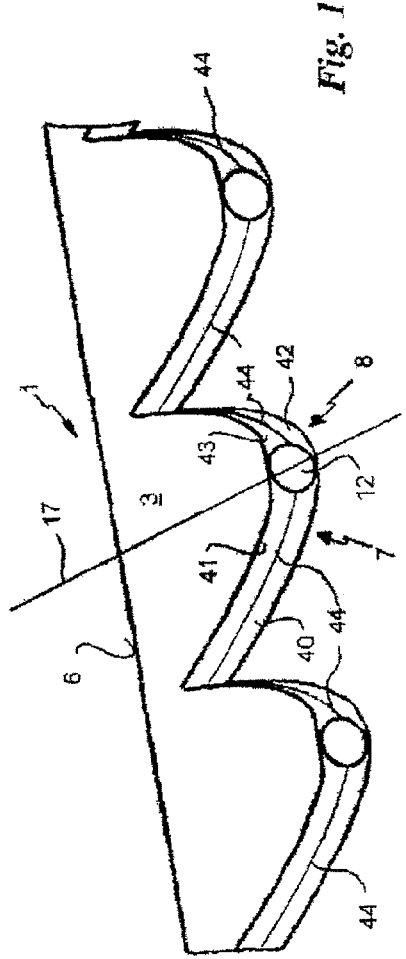
FIG. 1 is a diagrammatic perspective view of three mutually juxtaposed interconnected optical bodies according to the invention.
Figure 2:
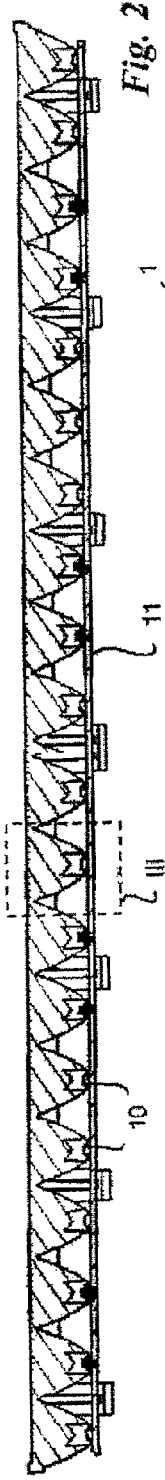
FIG. 2 is a sectional view through a vehicle light including a plurality of optical bodies arranged corresponding to FIG. 1, wherein the section plane coincides with the main central plane of the optical bodies.
Figure 3:
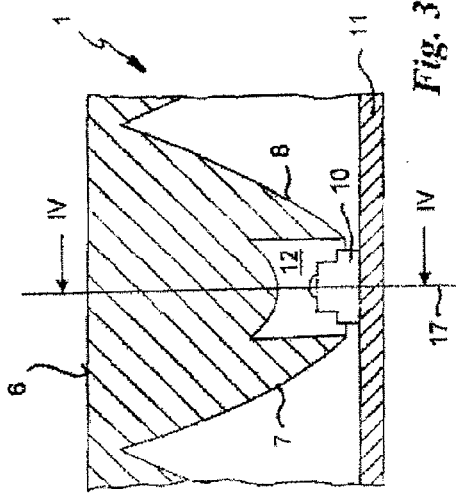
FIG. 3 is a sectional view on an enlarged scale of a portion corresponding to the part indicated at 111 in FIG. 2.
Figure 6:
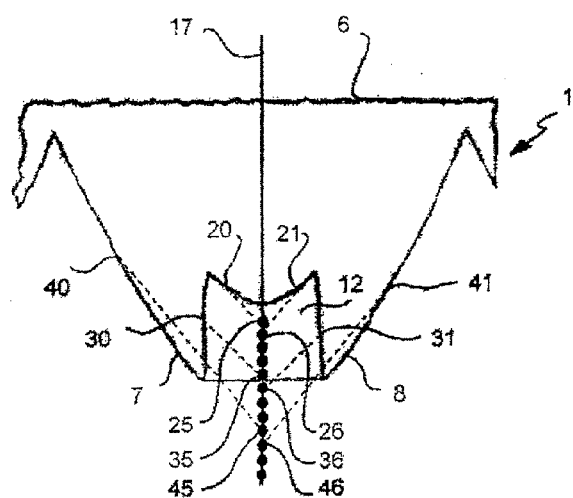
FIG. 6 is a diagrammatic sectional view corresponding to FIG. 3 with illustrated focal points.

As can be seen in particular from FIG. 1, the optical bodies according to the invention are of a substantially plate-shaped configuration, that is to say they have two main surface 3, 4 which are in mutually opposite relationship with respect to a main central plane and which are coincident in the vertical projections in FIGS. 2, 3 and 6 and of which only the upper main surface 3 is visible in FIG. 1 because of the perspective view.

Figure 4:
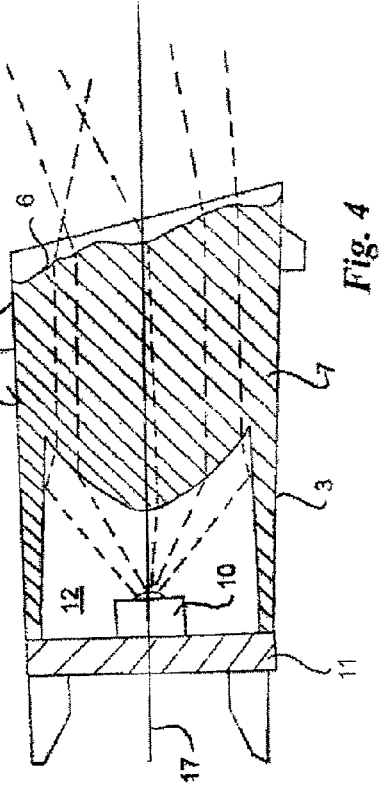
FIG. 4 is a sectional view perpendicular to the main central plane through an optical body according to the invention.
Figure 7:
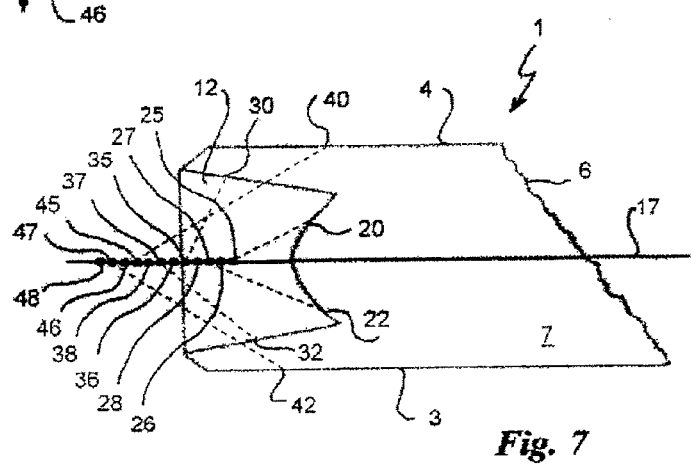
FIG. 7 is a diagrammatic sectional view corresponding to FIG. 4 with illustrated focal points.

The main surfaces 3 and 4 are connected together by side surfaces, to which the light emission surface 6 belongs, which, as can be seen in particular from FIGS. 4 and 7, intersects the two side surfaces 3, 4 at an angle different from 90°.

Figure 5:
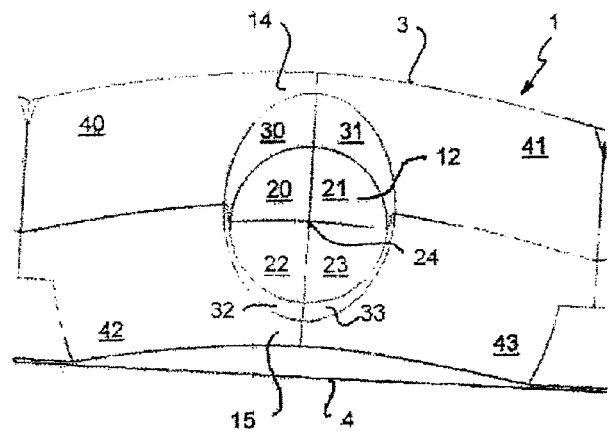
FIG. 5 is a perspective view at an angle from below of an optical body according to the invention.

In comparison, the two remaining slightly curved side surfaces 7, 8 extend approximately perpendicularly to the main surfaces 3, 4 and merge together on the side opposite to the light emission surface 6, i.e., in the region of the recess 12 serving for insertion of an LED 10. In that case, as shown in FIG. 1, the recess 12 can extend to the edges of the main surfaces 3, 4 or, as shown in FIG. 5, it can be separated from those edges by narrow edge regions 14, 15.

The main surfaces 3, 4 can be flat or also slightly curved. They can extend parallel to each other or they can extend in such a way that, in the region of the light emission surface 6, they are at a somewhat larger spacing from each other than in the region of the recess 12. If the arrangement involves such a mutual inclination, it is very slight so that overall there is only a slight deviation from a planar-parallel plate.

The recess 12 is approximately in the shape of a truncated cone of non-circular cross-section and has a central longitudinal axis 17 in relation to which the side walls of the recess 12 do not extend exactly symmetrically, as will also be described in detail hereinafter.

As can be seen in particular from FIGS. 2 to 4, an LED 10 is inserted from below into the recess 12 of each optical body 1 in such a way that the central axis of the light beam which is emitted therefrom and which diverges in a conical configuration that is coincident with the central longitudinal axis 17 of the recess 12. The LED 10 is mounted on a printed circuit board 11 on which the conductor tracks required for its power supply and actuation are provided in a known manner and which can be connected to the optical body 1 by latching engagement.

In the vehicle light shown in FIG. 2, all LEDs are mounted on a common circuit board 11 carried by the mutually juxtaposed optical bodies 1 which are connected together in one piece and which, in turn, can be inserted into a housing (not shown) serving to mount the vehicle light on the vehicle.

The cover region of the recess 12 is formed by an optical structure having an optical surface which projects convexly downwardly into the interior of the recess 12 and which, as can be seen, in particular, from FIG. 5, is subdivided into four optically active surface portions 20, 21, 22, 23 which are provided in a manner that is not rotationally symmetrical with respect to the central longitudinal axis 17 and which extend in quadrant-like fashion from a respective corner at the point 24 at which the central longitudinal axis 17 of the recess 12 passes through the cover wall, to the inner peripheral wall of the recess 12. Each of those optically active surface portions 20 to 23 is part of a parabolic surface, but each of them has its own focal point 25, 26, 27, 28. All of the focal points 25 to 28 lie on the longitudinal axis 17, but are mutually spaced in the direction of that axis, as can be seen in particular from FIGS. 6 and 7. Each of the optically active surface portions 20 to 23 serves to focus the incident light, in particular to render it approximately parallel.

The inner peripheral wall of the recess 12 is also subdivided into four optically active concave surface portions 30, 31, 32, 33 which are not rotationally symmetrical with respect to the central longitudinal axis 17 and of which each is part of a parabolic surface and has a focal point 35, 36, 37, 38; those focal points also lie on the central longitudinal axis 17 and are mutually spaced in the direction thereof.

As can be seen in particular from FIG. 3 the side surfaces 7, 8 are also optically active and are so shaped that the light which is radiated into the interior of the optical body 1 and which is incident thereon from the interior cannot escape through the same from the optical body 1, but is spread out by total reflection and is passed towards the light emission surface 6 on which there is also a further optical structure which homogenizes the light passing therethrough over the vertical and the horizontal angular range and further spreads it in such a way that greatly different installation angles are possible on the most widely varying vehicles, for a vehicle light of such a nature.

As FIGS. 1 and 5 show, each of the two side surface 7, 8 is subdivided into two surface portions 40, 41 and 42, 43, respectively, which extend in the longitudinal direction of the side surfaces 7, 8 and which adjoin each other along the lines of those side surfaces 7, 8 which intercept the main central plane. Each of those surface portions 40, 41 and 42, 43, respectively, is not rotationally symmetric with respect to the central longitudinal axis 17 and is, again, part of a parabolic surface. These surface portions all have mutually different focal points 45, 46, 47, 48 which lie on the central longitudinal axis 17 of recess 12 and are mutually spaced in the direction of that axis.

In the example described here, all focal points 25 to 28, 35 to 38 and 45 to 48 which lie on the central longitudinal axis 17 are mutually spaced, but embodiments are also possible in which the focal points of the first group respectively coincide with one of the focal points of the second group and with one of the focal points of the third group. Alternatively or supplemental thereto, it is also possible for two or three focal points within a group not to be mutually spaced.

However the first-mentioned case is preferred as that permits very uniform distribution of light over the light emission surface, irrespective of how far the respective LED 10 engages into the recess 12, so that widely different LED structural forms can be used without structural adaptation of the optical body according to the invention to the respective type LED being required.

What is claimed is:

1. An optical body for a vehicle light for coupling in, passing on and emitting the light delivered by a light source in a conical spatial region, comprising:
a light emission surface and
a recess which is opposite the light emission surface and which has a longitudinal axis and in which the light source can be so positioned that the central axis of the conical spatial region coincides with the longitudinal axis of the recess and wherein the recess has an annularly closed inner peripheral wall which surrounds the longitudinal axis and a cover wall which extends transversely relative to the longitudinal axis and which is provided with an optical structure for altering a spread angle of a light beam passing therethrough,
wherein the optical structure of the cover wall of the recess includes a plurality of optically active surface portions which are arranged around a point at which the longitudinal axis of the recess passes through the cover wall and each of which has a focal point lying on the longitudinal axis and wherein the focal points of at least two of said surface portions are mutually spaced in along the longitudinal axis.

2. An optical body according to claim 1 wherein the optical structure has four immediately mutually adjoining, substantially equally sized surface portions which subdivide the cover wall into four quadrants, all the focal points of which are spaced from each other along the longitudinal axis.

3. An optical body according to claim 1, wherein the surface portions of the cover wall are lens surfaces which are curved forwardly convexly into the interior of the recess and which blend uniformly into each other.

4. An optical body according to claim 1, wherein the peripheral wall includes a plurality of optically active surface portions, each of which has a focal point which lies on the longitudinal axis of the recess, and wherein the focal points of at least two of said surface portions are mutually spaced along the longitudinal axis.

5. An optical body according to claim 4, wherein the peripheral wall has four directly mutually adjoining, approximately equal-sized surface portions, all the focal points of which are spaced from each other along the longitudinal axis.

6. An optical body according to claim 5, wherein the surface portions of the peripheral wall are in the form of concave lens surfaces which blend uniformly into each other.

7. An optical body according to claim 1, wherein the focal point of at least one surface portion of the optical structure in the cover wall of the recess coincides with the focal point of one of the surface portions of the peripheral wall.

8. An optical body according to claim 1, further comprising two main surfaces which are mutually opposite each other with respect to a main central plane and which are connected together by side surfaces so as to form a plate-shaped configuration, wherein one of the side surfaces forms the light emission surface while the opposite side surface is formed only by narrow edge regions which surround the recess and starting from which two further side surfaces extend in the direction of the light emission surface and are shaped in a manner forming light conduction surfaces which pass on the light, that is coupled into the optical body and incident thereon from the interior, to the light emission surface by total reflection.

9. An optical body according to claim 8, wherein each of the two further side surfaces include two surface portions which extend in the longitudinal direction thereof and which mutually adjoin along section lines of the further side surfaces with the main central plane and each of which is in the form of part of an outwardly convex parabolic surface having a focal point on the longitudinal axis of the recess, and wherein the focal points of at least two of said surface portions are mutually spaced along the longitudinal axis.

10. An optical body according to claim 9, wherein all focal points of the surface portions are spaced from each other along the longitudinal axis.

11. An optical body according to claim 1, wherein at least one of the focal points lies on a portion of the longitudinal axis that is within the recess.

12. An optical body according to claim 11, wherein at least one of the focal points lies on a portion of the longitudinal axis of the recess that is outside the recess.

13. An optical body according to claim 11, wherein at least one of the focal points lies on a portion of the longitudinal axis of the recess that is outside the recess.

14. An optical body according to claim 1, wherein each of the optically active surface portions is part of a parabolic surface.

15. An optical body according to claim 1, wherein an optical emission means is provided on the light emission surface for homogenizing and spreading light passing therethrough over a vertical and a horizontal angular region.

16. An optical body according to claim 8, comprising a plurality of recesses and optical bodies arranged in a row parallel to said main central plane.

17. A vehicle light comprising at least one optical body for coupling in, passing on and emitting the light delivered by a light source in a conical spatial region, comprising:
   a light emission surface and
   a recess which is opposite the light emission surface and which has a longitudinal axis and in which the light source can be so positioned that the central axis of the conical spatial region coincides with the longitudinal axis of the recess and wherein the recess has an annularly closed inner peripheral wall which surrounds the longitudinal axis and a cover wall which extends transversely relative to the longitudinal axis and which is provided with an optical structure for altering a spread angle of a light beam passing therethrough,
   wherein the optical structure of the cover wall of the recess includes a plurality of optically active surface portions which are arranged around a point at which the longitudinal axis of the recess passes through the cover wall and each of which has a focal point lying on the longitudinal axis and wherein the focal points of at least two of said surface portions are mutually spaced in along the longitudinal axis.

18. A vehicle light according to claim 17, wherein said at least one optical body comprises a plurality of optical bodies arranged with the main central planes thereof lying in a common plane and with emission surfaces thereof blending into each other.

19. A vehicle light according to claim 18, wherein the optical bodies are integrally connected together.

* * * * *